(12) United States Patent
Wang

(10) Patent No.: US 10,830,332 B2
(45) Date of Patent: Nov. 10, 2020

(54) SMALL-SIZE REDUCTION GEARBOX

(71) Applicant: ZHEJIANG LINIX MOTOR CO., LTD, Dongyang (CN)

(72) Inventor: Ting Wang, Dongyang (CN)

(73) Assignee: ZHEJIANG LINIX MOTOR CO., LTD., Dongyang (CN)

( * ) Notice: Subject to any disclaimer, the term of this patent is extended or adjusted under 35 U.S.C. 154(b) by 163 days.

(21) Appl. No.: 16/148,983

(22) Filed: Oct. 1, 2018

(65) Prior Publication Data
US 2020/0018386 A1    Jan. 16, 2020

(30) Foreign Application Priority Data

Jul. 16, 2018 (CN) .......................... 2018 1 0775638

(51) Int. Cl.
| | |
|---|---|
| *F16H 57/029* | (2012.01) |
| *F16H 1/06* | (2006.01) |
| *F16H 57/021* | (2012.01) |
| *F16H 57/031* | (2012.01) |
| *F16J 15/32* | (2016.01) |
| F16H 57/02 | (2012.01) |

(52) U.S. Cl.
CPC ............. *F16H 57/029* (2013.01); *F16H 1/06* (2013.01); *F16H 57/021* (2013.01); *F16H 57/031* (2013.01); *F16J 15/32* (2013.01); F16H 2057/02034 (2013.01)

(58) Field of Classification Search
CPC ........ F16H 57/029; F16H 1/06; F16H 57/021; F16H 57/031; F16H 2057/02034
See application file for complete search history.

(56) References Cited

U.S. PATENT DOCUMENTS

| | | | | |
|---|---|---|---|---|
| 3,923,408 | A * | 12/1975 | Belsdorf | F16B 17/006 403/261 |
| 6,965,180 | B2 * | 11/2005 | Oh | F16C 17/08 310/89 |
| 2019/0225258 | A1 * | 7/2019 | Vonier | F16H 1/16 |

* cited by examiner

*Primary Examiner* — Thomas C Diaz
(74) *Attorney, Agent, or Firm* — Jiwen Chen; Jacobson Holman PLLC

(57) ABSTRACT

An object of the present invention is to provide a small-size reduction gearbox, which has a smaller size and reliable sealing without oil leakage. A small-size reduction gearbox is provided, comprising an involute gear and a driven gear assembly linked with the involute gear; the involute gear at least comprises a first fixation segment, an engagement segment, a transition segment and a second fixation segment, the engagement segment is located between the transition segment and the first fixation segment, the transition segment is located between the second fixation segment and the engagement segment, and the involute gear is processed by hobbing to obtain the engagement segment and the transition segment; the first fixation segment is fixed to a box body via a first bearing, a bushing is fixedly sheathed on the involute gear, the bushing consists of a first bushing portion and a second bushing portion, the first bushing portion has an outer diameter greater than that of the second bushing portion, the first bushing portion is sheathed on the transition segment and the second bushing portion is sheathed on the second fixation segment, and a second bearing is sheathed on the second bushing portion.

9 Claims, 3 Drawing Sheets

SMALL-SIZE REDUCTION GEARBOX

This application claims the priority benefit of Chinese Application No. 201810775638.0, filed Jul. 16, 2018 in Chinese, which is hereby incorporated by reference.

TECHNICAL FIELD OF THE INVENTION

The present invention relates to a small-size reduction gearbox.

BACKGROUND OF THE INVENTION

A reduction gearbox comprises an input gear, a plurality of transmission gears, and an output shaft of the reduction gearbox. The input gear is linked to an output shaft of a motor. The input gear is rotated to drive the transmission gears to rotate in order to realize the rotation of the output shaft of the reduction gearbox. In some reduction gearboxes, the transmission gears are involute gears having two ends each fixed to the box body via a bearing. The depth of the reduction gearbox is related to the distance between the bearings at the two ends of the involute gears.

After teeth are processed on an involute gear blank by a cutter, there is still a stroke of about 10 mm, so that an engagement segment and a transition segment are formed in the involute gear. That is, after teeth and tooth spaces are processed on the involute gear blank, there is still a groove formed on the involute gear blank. The groove is not suitable for engagement with the transmission gear no matter in depth, width or shape. As a result, there is a segment (the transition segment) wasted on the involute gear. Considering the sealing requirement at the joint between the reduction gearbox and the motor, it is unable to provide a bearing on the transition segment of the transmission gear. Due to the manufacturing process, there is a transition segment formed on the involute gear, which cannot be used for engagement with the gear and also cannot be used for fixing the bearing. As a result, the depth of the reduction gearbox is greater than the desired set depth, and the reduction gearbox thus has a large size.

If the bearing is directly fixed on the transition segment of the involute gear, the contact area between the bearing and the involute gear will become smaller since there is a groove on the transition segment. In the event of temperature rise, the involute gear is rotated, and it is highly possible to splash oil from the gap between the inner ring of the bearing and the involute gear.

SUMMARY OF THE INVENTION

An object of the present invention is to provide a small-size reduction gearbox, which has a smaller size and reliable sealing without oil leakage.

For this purpose, the present invention employs the following technical solution. A small-size reduction gearbox is provided, comprising an involute gear linked with an output shaft of a motor and a driven gear assembly linked with the involute gear; the driven gear assembly at least comprises one driven gear and an output shaft of a reduction gearbox, which is fixed to the driven gear, and the output shaft of the motor is rotated to drive the output shaft of the reduction gearbox to rotate; the involute gear at least consists of a first fixation segment, an engagement segment, a transition segment and a second fixation segment, the engagement segment is located between the transition segment and the first fixation segment, the transition segment is located between the second fixation segment and the engagement segment, and the involute gear is processed by hobbing to obtain the engagement segment and the transition segment; the first fixation segment is fixed to a box body via a first bearing, a bushing is fixedly sheathed on the involute gear, the bushing consists of a first bushing portion and a second bushing portion, the first bushing portion has an outer diameter greater than that of the second bushing portion, the first bushing portion is sheathed on the transition segment and the second bushing portion is sheathed on the second fixation segment, a second bearing is sheathed on the second bushing portion, an outer ring of the second bearing is fixed to the box body, and an axial face of an inner ring of the second bearing is resisted against an axial face of the first bushing portion.

In the present invention, by fixing the bushing on the transition segment of the involute gear and then fixing the second bearing on the bushing, the fixation position of the second bearing is closer to the fixation position of the first bearing. Therefore, in the reduction gearbox of the present invention, the part where the involute gear is to be arranged can be produced thinner, in order to make the size of the reduction gearbox smaller. With the arrangement of the first bushing portion of the bushing, the position of the second bearing after it is press-fitted can be determined, and it can be ensured that the second bearing is mounted in position. By the second bushing portion of the bushing, the contact area of the second bearing can be ensured, so that the fixation of the second bearing is more stable.

Preferably, the engagement segment has an outer diameter greater than that of the transition segment, and the bushing is fixed to the involute gear so that the first bushing portion comes into contact with the axial face of the engagement segment. Such an arrangement is used for positioning the bushing and facilitates the press-fitting and fixation of the bushing.

Preferably, the bushing is closely fitted on the involute gear, and both an inner edge of the second bushing portion and an outer edge of the second fixation segment are circular. With such an arrangement, the circumferential inner wall of the bushing can be closely clung to the circumferential outer wall of the involute gear. In this way, the sealing performance is improved, and the oil leakage from the joint between the reduction gearbox and the motor is avoided.

Preferably, a sealant is coated on both an inner surface and an outer surface of the bushing. Such an arrangement improves the sealing performance of the reduction gearbox.

Preferably, an oil seal is provided between the first bushing portion and the box body. Such an arrangement improves the sealing performance of the reduction gearbox.

Preferably, a linear fitting segment is provided at an end, which is away from the first fixation segment, of the involute gear; a coupling, a cross-section of which has a square outer edge, is sheathed on the fitting segment; a linear fitting groove is formed at an output end of the output shaft of the motor, and the coupling is closely fitted in the fitting groove; and the output end of the output shaft of the motor is fixed to a motor housing via a third bearing. In this arrangement, the fitting segment of the involute gear is extended into the motor to be linked to the output shaft of the motor, and the coupling is also arranged in the fitting groove on the output shaft of the motor, so that the reduction gearbox can be produced thinner and the size of the reduction gearbox can be thus smaller.

Preferably, a plurality of first fixation holes are formed on a cover of the reduction gearbox; the reduction gearbox is fixed to a fixation plate in a fixation portion via a fixation member; a second fixation hole is formed on the fixation plate; the fixation member comprises a fastening screw, a nut, a metallic sleeve, a rubber sleeve, a first rubber ring and a second rubber ring; the cover of the reduction gearbox is fixed to the fixation plate so that the rubber sleeve is located in the first fixation hole; the rubber sleeve is sheathed on the metallic sleeve; a threaded portion of the fastening screw passes through the metallic sleeve and the second fixation hole; and the first rubber ring is located between a head of the fastening screw and the metallic sleeve, the second rubber ring is located between the metallic sleeve and the fixation plate, and the metallic sleeve and the rubber sleeve are located between the first rubber ring and the second rubber ring. When the reduction gearbox operates, the rubber sleeve, the first rubber ring and the second rubber ring are used for the shock absorption at the joint between the cover of the reduction gearbox and the fixation plate, in order to reduce the vibration generated when the reduction gearbox operates. The fixation plate is a plate portion for mounting various reduction gearboxes, for example, the frame portion of a wheelchair.

Preferably, a gasket is sheathed on the fastening screw and the gasket is located between the head of the fastening screw and the first rubber ring. Such an arrangement ensures better fixation of the reduction gearbox.

In the present invention, the transition segment of the involute gear is utilized. By providing a bushing on the transition segment to facilitate the fixation of the second bearing, the distance between the first bearing and the second bearing is smaller. Meanwhile, the fitting segment of the involute gear is extended into the motor to be linked to the output shaft of the motor, the reduction gearbox of the present invention can be produced thinner and the size of the reduction gearbox of the present invention can be smaller. In the present invention, by coating sealant on both the inner surface and the outer surface of the bushing, the sealing performance of the present invention is better, without oil leakage from the joint between the reduction gearbox and the motor.

DETAILED DESCRIPTION OF THE INVENTION

The present invention will be further described below by specific embodiments with reference to accompanying drawings.

Figure 1:
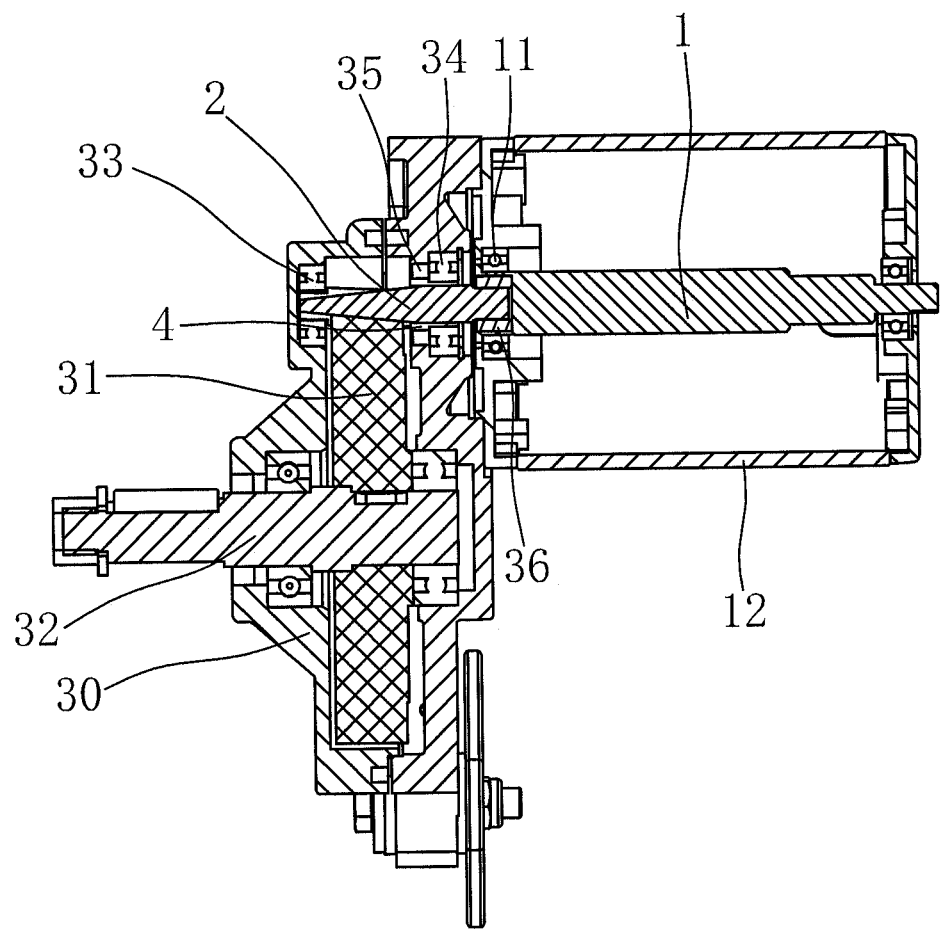
FIG. 1 is a sectional view of the present invention.
Figure 2:
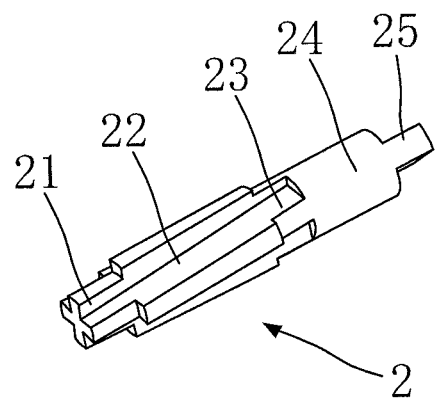
FIG. 2 is a structural diagram of an involute gear of the present invention.
Figure 3:
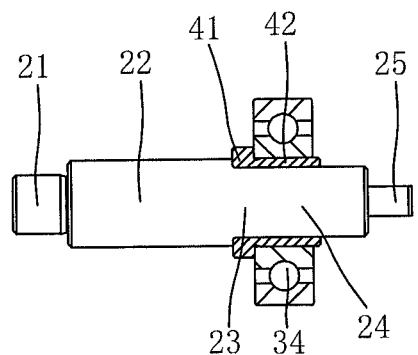
FIG. 3 is a view showing the fitting of the involute gear, the bushing and the second bearing in the present invention.

Referring to FIG. 1 to FIG. 3, a small-size reduction gearbox is provided, comprising an involute gear 2 linked with an output shaft 1 of a motor and a driven gear assembly linked with the involute gear 2; and the driven gear assembly at least comprises one driven gear 31 and an output shaft 32 of a reduction gearbox, which is fixed to the driven gear 31, and the output shaft 1 of the motor is rotated to drive the output shaft 32 of the reduction gearbox to rotate.

The involute gear 2 comprises a first fixation segment 21, an engagement segment 22, a transition segment 23, a second fixation segment 24 and a fitting segment 25. The engagement segment 22 is located between the transition segment 23 and the first fixation segment 21, the transition segment 23 is located between the second fixation segment 24 and the engagement segment 22, the first fixation segment 21 and the fitting segment 25 are located at two ends of the involute gear 2, and the involute gear 2 is processed by hobbing to obtain the engagement segment 22 and the transition segment 23.

The first fixation segment 21 is fixed to a box body 30 of the reduction gearbox via a first bearing 33, a bushing 4 is fixedly sheathed on the involute gear 2, the bushing 4 consists of a first bushing portion 41 and a second bushing portion 42, the first bushing portion 41 has an outer diameter greater than that of the second bushing portion 42, the first bushing portion 41 is sheathed on the transition segment 23 and the second bushing portion 42 is sheathed on the second fixation segment 24, a second bearing 34 is sheathed on the second bushing portion 42, an outer ring of the second bearing 34 is fixed to the box body 30, and an axial face of an inner ring of the second bearing 34 is resisted against an axial face of the first bushing portion 41.

The engagement segment 22 has an outer diameter greater than that of the transition segment 23, and the bushing 4 is fixed to the involute gear 2 so that the first bushing portion 41 comes into contact with the axial face of the engagement segment 22. The bushing 4 is closely fitted on the involute gear 2, and both an inner edge of the bushing 4 and an outer edge of the second fixation segment 24 are circular. A sealant is coated on both an inner surface and an outer surface of the bushing 4. An oil seal 35 is provided between the first bushing portion 41 and the box body 30.

A linear fitting segment 25 is provided at an end, which is away from the first fixation segment 21, of the involute gear 2; a coupling 36, a cross-section of which has a square outer edge, is sheathed on the fitting segment 25; a linear fitting groove is formed at an output end of the output shaft 5 of the motor, and the coupling 36 made of plastic material is closely fitted in the fitting groove; and the output end of the output shaft 1 of the motor is fixed to a motor housing 12 via a third bearing 11.

Figure 4:
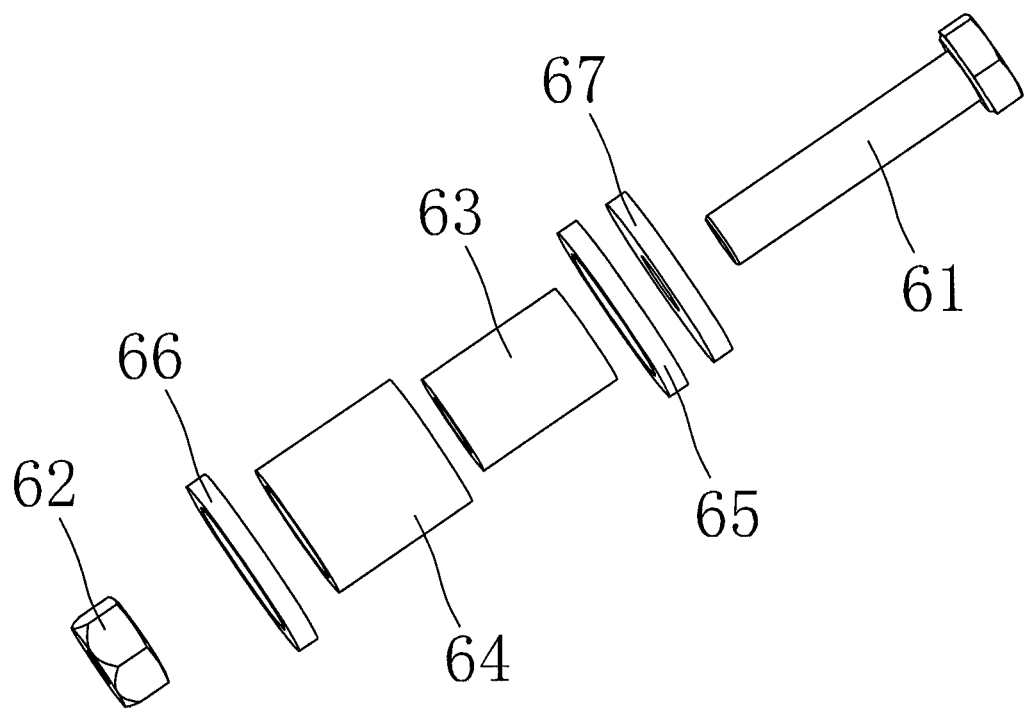
FIG. 4 is an exploded view of a fastener of the present invention.
Figure 5:
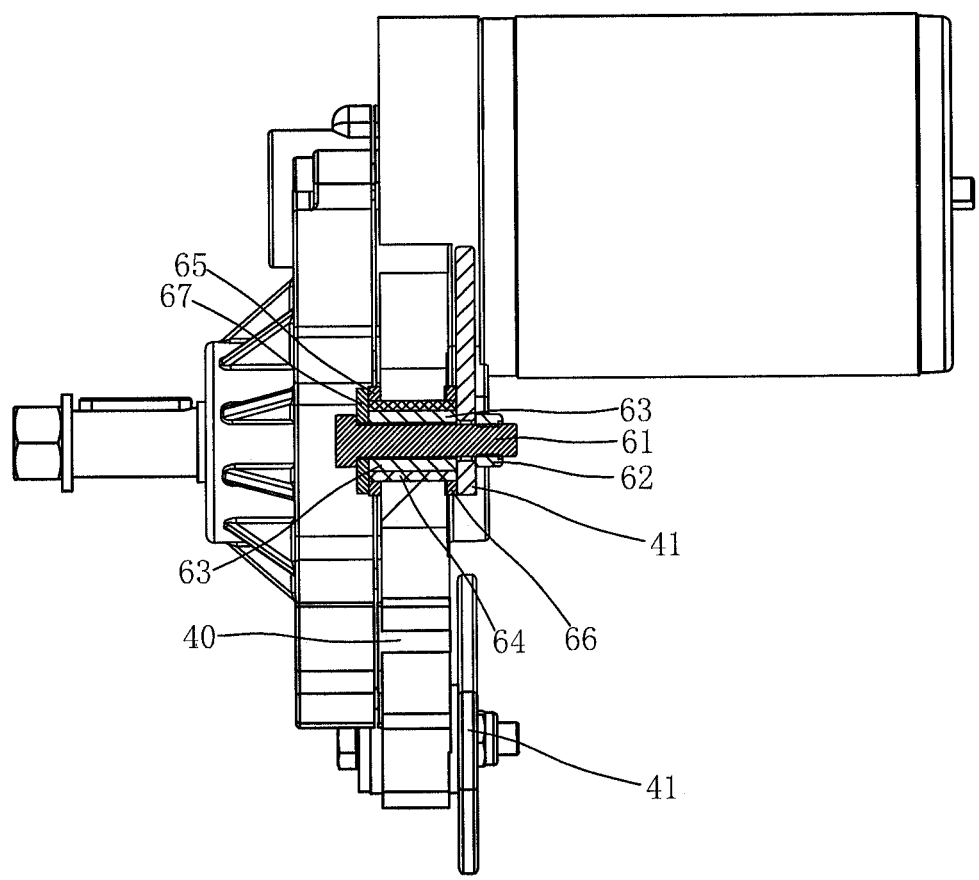
FIG. 5 is a structural diagram of the present invention when the fastener is used.

Referring to FIG. 4 and FIG. 5, a plurality of first fixation holes are formed on a cover 40 of the reduction gearbox; the cover 40 of the reduction gearbox is fixed to a fixation plate 41 in a fixation portion via a fixation member; a second fixation hole is formed on the fixation plate 41; the fixation member comprises a fastening screw 61, a nut 62, a metallic sleeve 63, a rubber sleeve 64, a first rubber ring 65 and a second rubber ring 66; the cover 40 of the reduction gearbox is fixed to the fixation plate 51 so that both the rubber sleeve 64 and the metallic sleeve 63 are located in the first fixation hole; the rubber sleeve 64 is sheathed on the metallic sleeve 63; a threaded portion of the fastening screw 61 passes through the metallic sleeve 63 and the second fixation hole; and the first rubber ring 65 is located between a head of the fastening screw 61 and the metallic sleeve 63, the second rubber ring 66 is located between the metallic sleeve 63 and the fixation plate 41, and the metallic sleeve 63 and the rubber sleeve 64 are located between the first rubber ring 65 and the second rubber ring 66. A gasket 67 is sheathed on the fastening screw 61 and the gasket 67 is located between the head of the fastening screw 61 and the first rubber ring 65.

In the present invention, the transition segment of the involute gear is utilized. By providing a bushing on the transition segment to facilitate the fixation of the second bearing, the distance between the first bearing and the second bearing is smaller. Meanwhile, the fitting segment of the involute gear is extended into the motor to be linked to the output shaft of the motor, the reduction gearbox of the present invention can be produced thinner and the size of the reduction gearbox of the present invention can be smaller. In the present invention, by coating sealant on both the inner surface and the outer surface of the bushing, the sealing performance of the present invention is better, without oil leakage from the joint between the reduction gearbox and the motor.

The invention claimed is:

1. A small-size reduction gearbox, comprising an involute gear linked with an output shaft of a motor and a driven gear assembly linked with the involute gear; the driven gear assembly at least comprises one driven gear and an output shaft of a reduction gearbox, which is fixed to the driven gear, and the output shaft of the motor is rotated to drive the output shaft of the reduction gearbox to rotate; the involute gear at least comprising a first fixation segment, an engagement segment, a transition segment and a second fixation segment; the engagement segment is located between the transition segment and the first fixation segment, the transition segment is located between the second fixation segment and the engagement segment, and the involute gear is processed by hobbing to obtain the engagement segment and the transition segment; the first fixation segment is fixed to a box body via a first bearing, a bushing is fixedly sheathed on the involute gear, the bushing comprises a first bushing portion and a second bushing portion, the first bushing portion has an outer diameter greater than that of the second bushing portion, the first bushing portion is sheathed on the transition segment and the second bushing portion is sheathed on the second fixation segment, a second bearing is sheathed on the second bushing portion, an outer ring of the second bearing is fixed to the box body, and an axial face of an inner ring of the second bearing is resisted against an axial face of the first bushing portion.

2. The small-size reduction gearbox according to claim 1, characterized in that the engagement segment has an outer diameter greater than that of the transition segment, and the bushing is fixed to the involute gear so that the first bushing portion comes into contact with the axial face of the engagement segment.

3. The small-size reduction gearbox according to claim 1, characterized in that both an inner edge of the second bushing portion and an outer edge of the second fixation segment are circular.

4. The small-size reduction gearbox according to claim 3, characterized in that sealant is coated on both an inner surface and an outer surface of the bushing.

5. The small-size reduction gearbox according to claim 1, characterized in that sealant is coated on both an inner surface and an outer surface of the bushing.

6. The small-size reduction gearbox according to claim 1, characterized in that an oil seal is provided between the first bushing portion and the box body.

7. The small-size reduction gearbox according to claim 1, characterized in that a linear fitting segment is provided at an end, which is away from the first fixation segment, of the involute gear; a coupling, a cross-section of which has a square outer edge, is sheathed on the fitting segment; a linear fitting groove is formed at an output end of the output shaft of the motor; and the output end of the output shaft of the motor is fixed to a motor housing via a third bearing.

8. The small-size reduction gearbox according to claim 1, characterized in that a plurality of first fixation holes are formed on a cover of the reduction gearbox; the reduction gearbox is fixed to a fixation plate in a fixation portion via a fixation member; a second fixation hole is formed on the fixation plate; the fixation member comprises a fastening screw, a nut, a metallic sleeve, a rubber sleeve, a first rubber ring and a second rubber ring; the cover of the reduction gearbox is fixed to the fixation plate so that the rubber sleeve is located in the first fixation hole; the rubber sleeve is sheathed on the metallic sleeve; a threaded portion of the fastening screw passes through the metallic sleeve and the second fixation hole; and the first rubber ring is located between a head of the fastening screw and the metallic sleeve, the second rubber ring is located between the metallic sleeve and the fixation plate, and the metallic sleeve and the rubber sleeve are located between the first rubber ring and the second rubber ring.

9. The small-size reduction gearbox according to claim 8, characterized in that a gasket is sheathed on the fastening screw and the gasket is located between the head of the fastening screw and the first rubber ring.

* * * * *